United States Patent
Al-Qutub et al.

(10) Patent No.: US 7,451,948 B2
(45) Date of Patent: Nov. 18, 2008

(54) APPARATUS FOR DEICING A SURFACE OF AN AIRCRAFT

(76) Inventors: Amro M. Al-Qutub, KFUPM, Dhahran, PO Box 913, Dhahran (SA) 31261; Muhammad A. Hawwa, P.O. Box 1747, KFUPM, Dhahran 31261 (SA)

( * ) Notice: Subject to any disclaimer, the term of this patent is extended or adjusted under 35 U.S.C. 154(b) by 354 days.

(21) Appl. No.: 11/433,675

(22) Filed: May 15, 2006

(65) Prior Publication Data

US 2007/0262202 A1 Nov. 15, 2007

(51) Int. Cl.
*B64D 15/16* (2006.01)
*B64D 15/18* (2006.01)
*B64C 9/00* (2006.01)

(52) U.S. Cl. .................... 244/134 R; 244/213
(58) Field of Classification Search .......... 244/134 R, 244/134 E, 134 F, 214, 204, 204.1, 198, 200, 244/200.1, 201, 213, 215, 206, 217, 134 A; 343/704

See application file for complete search history.

(56) References Cited

U.S. PATENT DOCUMENTS

| 2,135,119 | A | * | 11/1938 | Wood | 244/134 A |
| 4,851,817 | A | * | 7/1989 | Brossia et al. | 340/583 |
| 5,014,042 | A | * | 5/1991 | Michoud et al. | 340/583 |
| 5,590,854 | A | * | 1/1997 | Shatz | 244/206 |

\* cited by examiner

*Primary Examiner*—John Q. Nguyen
*Assistant Examiner*—Stephen Brookman
(74) *Attorney, Agent, or Firm*—Lowe Hauptman Ham & Berner, LLP

(57) ABSTRACT

An apparatus for deicing a surface of an aircraft includes a pair of adjacent movable surface elements that lie in a common plane and cover a portion of an aircraft. The pair of surface elements are connected to a reciprocating actuator through a bell crank for reciprocal movement and in opposite directions to one another. The apparatus also includes a tie bar at one end of the surface elements for maintaining the surface elements in a parallel relationship. In a second embodiment of the invention, the apparatus includes a pair of coaxial, coplanar circular disc and a reciprocating actuator for rotating the disc in opposite directions relative to one another.

6 Claims, 3 Drawing Sheets

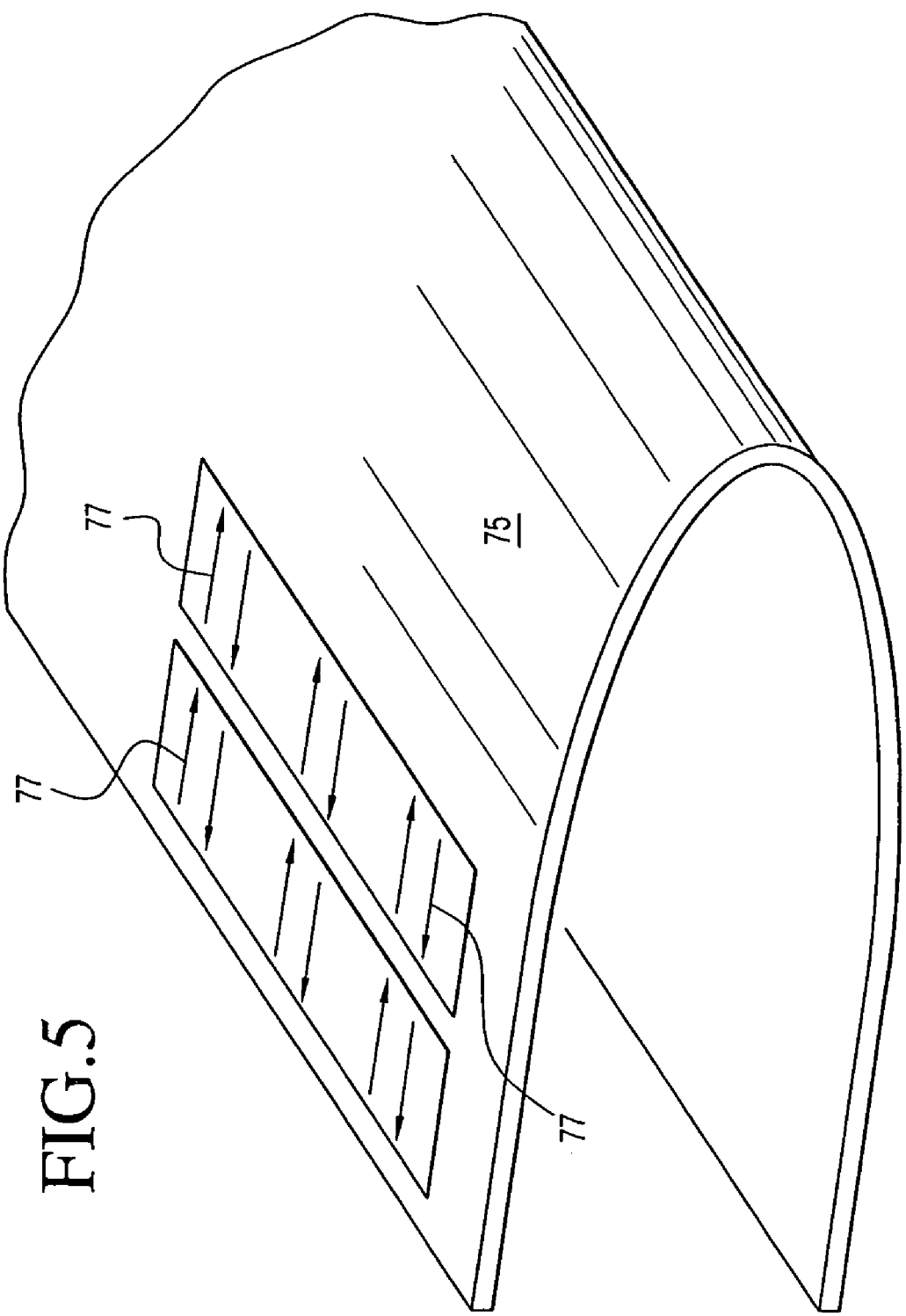

APPARATUS FOR DEICING A SURFACE OF AN AIRCRAFT

BACKGROUND FOR THE INVENTION

This invention relates to an apparatus for deicing a surface of an aircraft and more particularly to an apparatus for providing relative motion between adjacent surface areas to fracture any ice accumulated thereon.

The accumulation of ice on various surfaces of an aircraft can produce disastrous results. Accordingly, it is important for a pilot to know when ice starts to appear and to take measures to avoid serious consequences. For example, a pilot may turn on surface heaters, make changes in speed or elevation, changes in the angle of attach and/or land at the nearest airport before the problem becomes critical. Several approaches have been taken to detect ice on the surfaces of airborne aircraft. For example a U.S. Pat. No. 4,851,817 of Bronia discloses a realtime detection of water and ice on surfaces by monitoring variations in light energy transmitted through an optical fiber having a specially processed sensitive probe. A more recent approach to detecting ice on the surface of an aircraft is disclosed by a U.S. Pat. No. 5,014,042 of Michaoud et al. As disclosed therein, a source sends light towards a receiver through an optical channel, a part of which has an interface with the external environment. The light that reaches this interface is reflected toward the receiver when the external environment is in contact with air and is refracted toward the external environment in the presence of water and ice.

Federal regulations prohibit flight in icy conditions that exceed those defined in F.A.R. Part 25, Appendix C. Nevertheless, flights in freezing drizzle or freezing rain where the size of super cooled water droplets suspended in air and ready to freeze on the first solid object that they touch exist in the atmosphere and pose the greatest icing hazard. Such conditions are regularly encountered by commercial aircraft on authorized flights. Freezing drizzle in particular, is a silent killer which is only made worse by darkness and its accumulation on aircraft surfaces where ice build up may be lethal.

A more serious problem relates to the problem of removing existing ice from an aircraft surface during flight. For example, if a pilot encounters severe icing conditions, it is imperative that the ice be removed from the aircraft as quickly as possible. A first approach to this problem is disclosed in U.S. Pat. No. 2,135,119 of Wood. As disclosed therein a plurality of slats or vibrators are movable toward and away from each other or moved back and forth relative to each other to break up any accumulated ice. A more recent approach is described in a U.S. Pat. No. 5,590,854 of Shatz wherein a movable sheet overlays a wing and can be moved back and forth to dislodge the ice. Notwithstanding the above, it is presently believed that modern aircraft are not adequately equipped to quickly remove accumulated ice from the surface of an airborne aircraft. It is also presently believed that there is a relatively large potential market for an improved apparatus for deicing a surface of an aircraft in accordance with the present invention.

It is also believed that the apparatus in accordance with the present invention will remove any accumulated ice quickly, effectively and efficiently and avoid serious hazards which are frequently encountered by pilots. It is also believed that the apparatus in accordance with the present invention will remove accumulated ice quickly, effectively and efficiently and avoid serious consequences when flying under dangerous conditions. As a result, pilots may be able to fly under more serious conditions then presently considered safe. Further, it is presently believe that the apparatus in accordance with the present invention can be manufactured and sold at a reasonable cost, will be durable and can be installed adjacent to the most critical area of the aircraft.

BRIEF SUMMARY OF THE INVENTION

In essence, the present invention contemplates an apparatus for deicing a surface of an aircraft. The apparatus includes a pair of adjacent movable surface elements which cover a portion of an aircraft such as a wing and a reciprocal actuator for moving the adjacent surface elements in opposite directions relative to one another. In a preferred embodiment of the invention, each of the movable surface elements have first and opposite end portions. The apparatus also includes a fixed base and means for pivotally connecting the reciprocal actuator to the fixed base. In addition, the apparatus includes a subactuating member such as a bell crank typically connected to a base and to the reciprocating actuator and to each of the adjacent movable surface elements. Further an oscillating connector bar or tie rod is also fixed to a base and to each of the adjacent movable surface elements at opposite ends thereof to maintain a parallel relationship between the adjacent surface areas as they are moved back and forth during reciprocal movement. In this way ice that has accumulated on the surface will be fractured and then blown away by the air as it passes over the wing or other portion of the structure.

In a second embodiment of the invention, a pair of coaxial coplanar movable circular surface elements cover a portion of an aircraft such as a wing. A reciprocal actuator moves one of the coaxial coplanar circular surface elements with respect to the other of the circular surface elements. This embodiment of the invention also includes a fixed base with a reciprocal actuator pivotally attached to the fixed base and to one of the pair of coaxial coplanar circular surface elements. The apparatus according to this embodiment of the invention also includes a displacement means typically connected to each of said pair of coaxial coplanar circular surface elements and for displacing one of the pair of surface elements with respect to the other. In this way the relative movement of the circular surface elements fractures or breaks up any ice formed thereon so that it is blown away by the wind passing over the aircraft.

The invention will now be defined in connection with the accompanying drawings wherein like reference numerals are used to identify like parts.

DESCRIPTION OF THE FIGURES

FIG. 5 is a schematic illustration of a wing of an aircraft and a plurality of movable panels in accordance with a first embodiment of the invention.

DESCRIPTION OF THE PREFERRED EMBODIMENTS OF THE INVENTION

Figure 1:
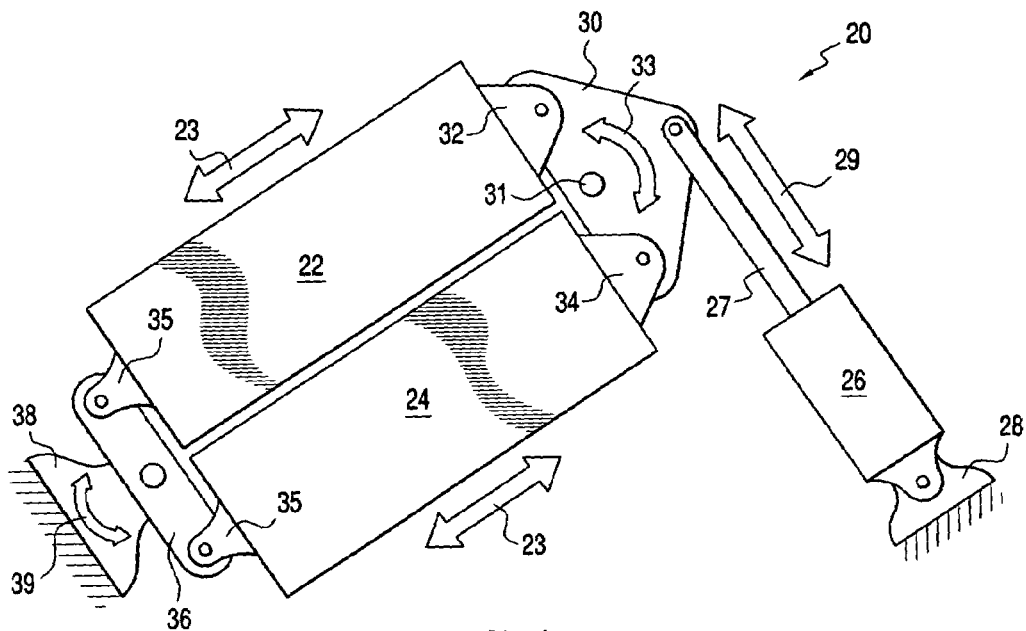
FIG. 1 is a top schematic view of an apparatus in accordance with a first embodiment of the present invention.

As shown in FIG. 1 an apparatus for deicing a surface of an aircraft 20 includes a pair of adjacent coplanar movable surface elements 22 and 24. As shown, the surface elements 22 and 24 define a generally rectangular shape and are disposed in a side-by-side relationship for movement along their longitudinal axes as shown by the arrow 23. These elements are preferably made of a lightweight metal and have a composition and thickness which is about the same as the skin covering the wing.

A reciprocal actuator 26 of conventional design is pivotally connected to a base member 28. This base member is fixed to a structural element in the aircraft such as a wing and fixes the apparatus 20 with respect to the aircraft. Other portions of the operation are also pivotally connected to a base member which may comprise a separate metal plate or separate bases that are fixed to one or more structural elements in the aircraft. The actuator 26 which may comprise a reciprocal piston includes an outwardly extending arm or rod 27 which moves forward and back as illustrated by the arrow 29. The rod 29 is pivotally connected to a generally triangular shape subactuating member or bell crank 30 which in turn is pivotally mounted to a base member by a pivot 31 so that it moves back and forth as indicated by an arrow 33. Each of the surface elements 22 and 24 include first extension elements 32 and 34 fixed at one end thereof. The extension elements 32 and 34 are pivotally connected to the bell crank 30 for back and forth movement in a direction of an arrow 23 and in a direction which is perpendicular to the arm 27 and direction of arrow 29.

The surface elements 22 and 24 also each include a second extension element 35 and 37 fixed to an opposite end thereof. These extension elements are pivotally connected to an oscillating connector bar or tie bar 36 which is pivotally connected to a base member 38 for movement in the direction of an arrow 39. The tie bar 36 maintains the parallel position of the movable surface elements 24 as they move back and forth in the direction of the arrow 23.

Figure 2:
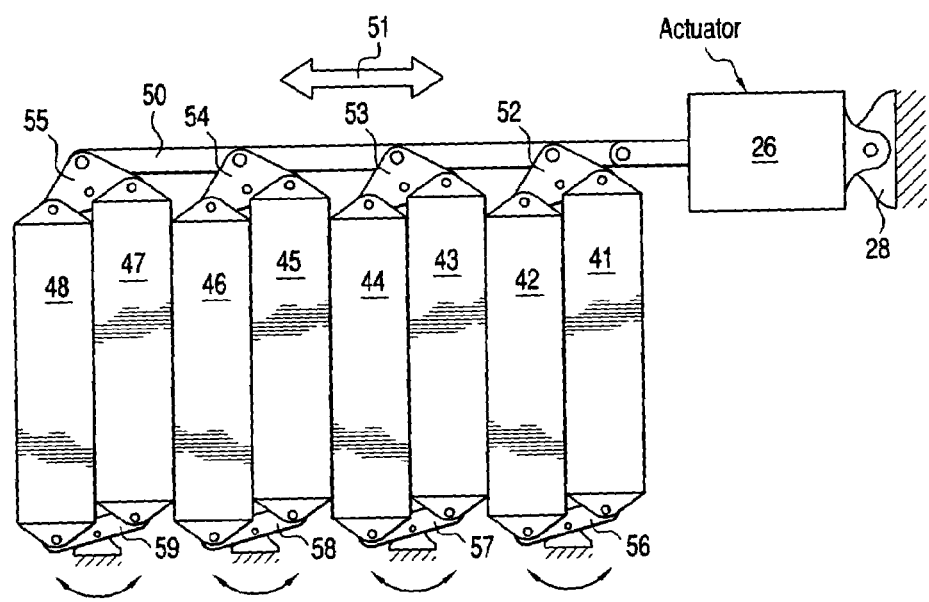
FIG. 2 is a top schematic illustration of an apparatus according to the first embodiment of the invention which include multiple pairs of movable surface elements driven by a single actuator.

Referring now to FIG. 2, a single actuator 26 moves a plurality of pairs of movable surface elements 41, 42, 43, 44, 45, 46, 47 and 48 by means of a rod 50 which moves back and forth in the direction of arrow 51 in the same manner as described in connection with FIG. 1. As illustrated, the rod 50 is pivotally connected to crank arms 52, 53, 54 and 55 which are in turn connected to the movable surface elements 41-48. The movable surface elements 41-48 also include extension elements similar to those shown in FIG. 1 wherein the upper extension element are pivotally connected to bell cranks 52-55 and the lower extension elements are fixed to the tie bars 56, 57, 58 and 59 which in turn are pivotally mounted on a brace member for maintaining the surface elements parallel to one another and perpendicular to the arrow 51.

Figure 3:
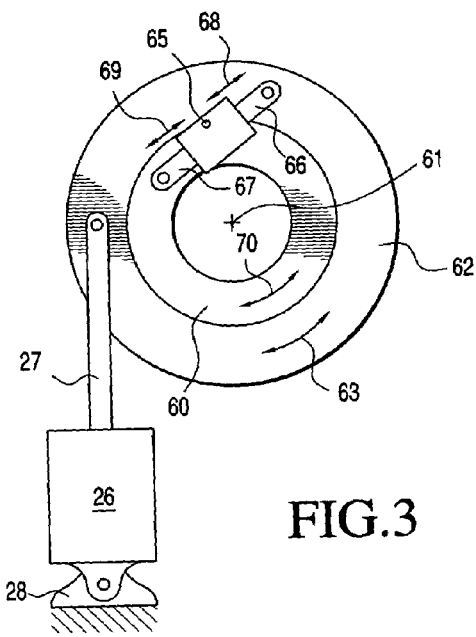
FIG. 3 is a top schematic illustration of a second embodiment of the invention.

A further embodiment of the invention is illustrated in FIG. 3 wherein a pair of coaxial coplanar circular surface elements referred to as an outer disc 60 and inner disc 62 are adapted to rotate about their common axis 61. As shown reciprocating actuator 26 is pivotally connected to the base member 28 in the same manner as shown in FIG. 1. The actuator 26 also includes a rod 27 which is pivotally connected to the outer disc 62 for back and forth movement as illustrated by the arrow 63. As shown in FIG. 3 a second actuator 65 includes rods 66 and 67 which move back and forth as indicated by arrow 68 and 69 to move the outer disc 62 with respect to the inner disc 60 as indicated by the arrows 63 and 70.

Figure 4:
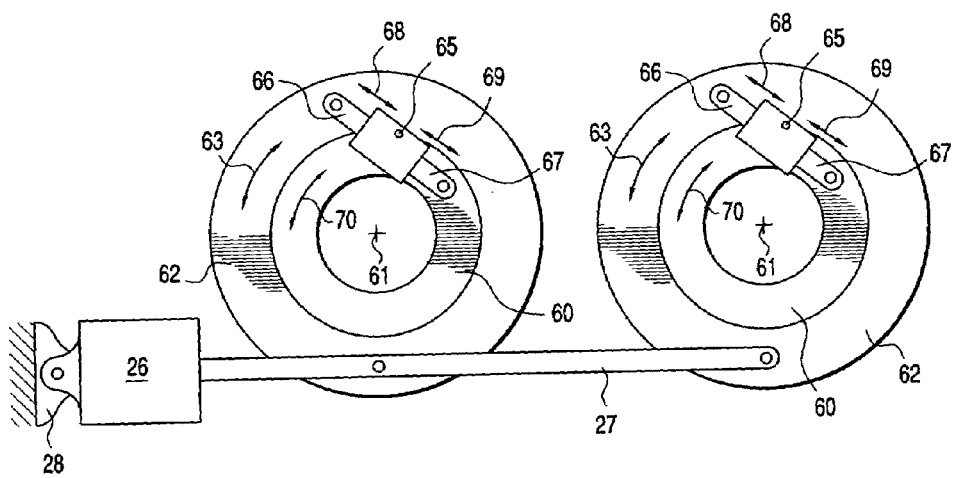
FIG. 4 is a schematic illustration of a third embodiment of the invention.

FIG. 4 illustrates a further embodiment wherein multiple discs are driven by an actuator 26 and subactuator 65 in the same manner as described in connection with FIG. 3.

FIG. 5 is a schematic illustration of a portion of an aircraft wing 75 with a plurality of arrows 77 indicating the installation of a plurality of movable surface elements as shown in FIG. 2.

While the invention has been described in connection with its preferred embodiments, it should be recognized that changes and modifications may be made therein without departing from the scope of the appended claims.

What is claimed is:

1. Apparatus for deicing a surface of an aircraft, said apparatus being part of the aircraft and comprising:
   a pair of adjacent movable surface elements covering a portion of an aircraft and a reciprocating actuator for moving said adjacent surface elements in opposite directions relative to one another and each of said movable surface elements having first and opposite end portions;
   a fixed base and said reciprocating actuator pivotally connected to said base, and a subactuating member pivotally connected to a second fixed base and said reciprocating actuator, and said subactuating member pivotally connected to each of said pair of adjacent movable surface elements at said first ends thereof;
   an oscillating connector bar pivotally fixed to a third fixed base and to each of said adjacent movable surface elements at said opposite ends thereof to maintain said adjacent elements in parallel relationship to one another during reciprocal movement thereof;
   whereby said movement of said movable surface elements fracture any ice accumulated thereon.

2. Apparatus for deicing a surface of an aircraft according to claim 1 in which each of said movable surface elements has an elongated rectangular shape.

3. Apparatus for deicing a surface of an aircraft according to claim 2 in which said subactuating member is a bell crank.

4. Apparatus for deicing a surface of an aircraft according to claim 3 in which each of said movable surface elements includes an outer extension at each end thereof for pivotally connecting said movable surface elements to said bell crank and to said connector bar.

5. Apparatus for deicing a surface of an aircraft according to claim 4 which includes a plurality of said pairs of adjacent movable surface elements.

6. Apparatus for deicing a surface of an aircraft according to claim 5 wherein each of said movable surface elements is in sliding contact with an adjacent movable surface element.

* * * * *

UNITED STATES PATENT AND TRADEMARK OFFICE
CERTIFICATE OF CORRECTION

| | | |
|---|---|---|
| PATENT NO. | : 7,451,948 B2 | Page 1 of 1 |
| APPLICATION NO. | : 11/433675 | |
| DATED | : November 18, 2008 | |
| INVENTOR(S) | : Amro M. Al-Qutub et al. | |

It is certified that error appears in the above-identified patent and that said Letters Patent is hereby corrected as shown below:

On the Title Page, please insert the following:

Item --(73) Assignee: King Fahd University of Petroleum and Minerals, Dhahran (SA)--

Signed and Sealed this

Fourteenth Day of August, 2012

David J. Kappos
*Director of the United States Patent and Trademark Office*